United States Patent
Kobayashi et al.

[11] Patent Number: 5,902,210
[45] Date of Patent: May 11, 1999

[54] METHOD AND APPARATUS FOR CONTROLLING A VEHICLE

[75] Inventors: Hirohisa Kobayashi; Masayuki Hosono, both of Atsugi, Japan

[73] Assignee: Unisia Jecs Corporation, Kanagawa-ken, Japan

[21] Appl. No.: 08/937,189

[22] Filed: Sep. 29, 1997

[30] Foreign Application Priority Data

Oct. 1, 1996 [JP] Japan ................................ 8-261021

[51] Int. Cl.$^6$ .................................................. B60K 41/08
[52] U.S. Cl. ............................ 477/118; 477/110; 123/399
[58] Field of Search ............................ 477/97, 110, 118, 477/900, 901, 905, 121; 123/352, 399; 701/54, 110

[56] References Cited

U.S. PATENT DOCUMENTS

| | | | |
|---|---|---|---|
| 4,750,598 | 6/1988 | Danno et al. | 477/110 |
| 5,287,773 | 2/1994 | Nakawaki et al. | 477/110 X |
| 5,496,227 | 3/1996 | Minowa et al. | 477/110 X |
| 5,772,554 | 6/1998 | Tabata | 477/118 X |

FOREIGN PATENT DOCUMENTS 8-26001  1/1996  Japan .

Primary Examiner—Charles A. Marmor
Assistant Examiner—Sherry Lynn Estremsky
Attorney, Agent, or Firm—McDermott, Will & Emery

[57] ABSTRACT

A control for a vehicle fitted with an internal combustion engine as a power source. At the time of a driver deceleration intention (when travelling downhill), then with an arrangement where the opening control for the throttle valve and the fuel supply control (fuel cut off control or the like) are automatically controlled in order to obtain a predetermined target vehicle acceleration, when the intention of the driver shifts from a deceleration intention to a non deceleration intention, and hence the automatic control reverts to normal control, the fuel supply control is returned to normal control once the throttle valve opening has reached a predetermined opening. In this way, it is possible to avoid the situation where for example, the fuel supply control reverts to normal control with the throttle valve opened more than necessary. Consequently the occurrence of shock or an unintended acceleration due to a mismatch in the throttle opening at the time of reverting to normal control can be suppressed. Hence vehicle drivability can be further improved.

8 Claims, 12 Drawing Sheets

TTMAP

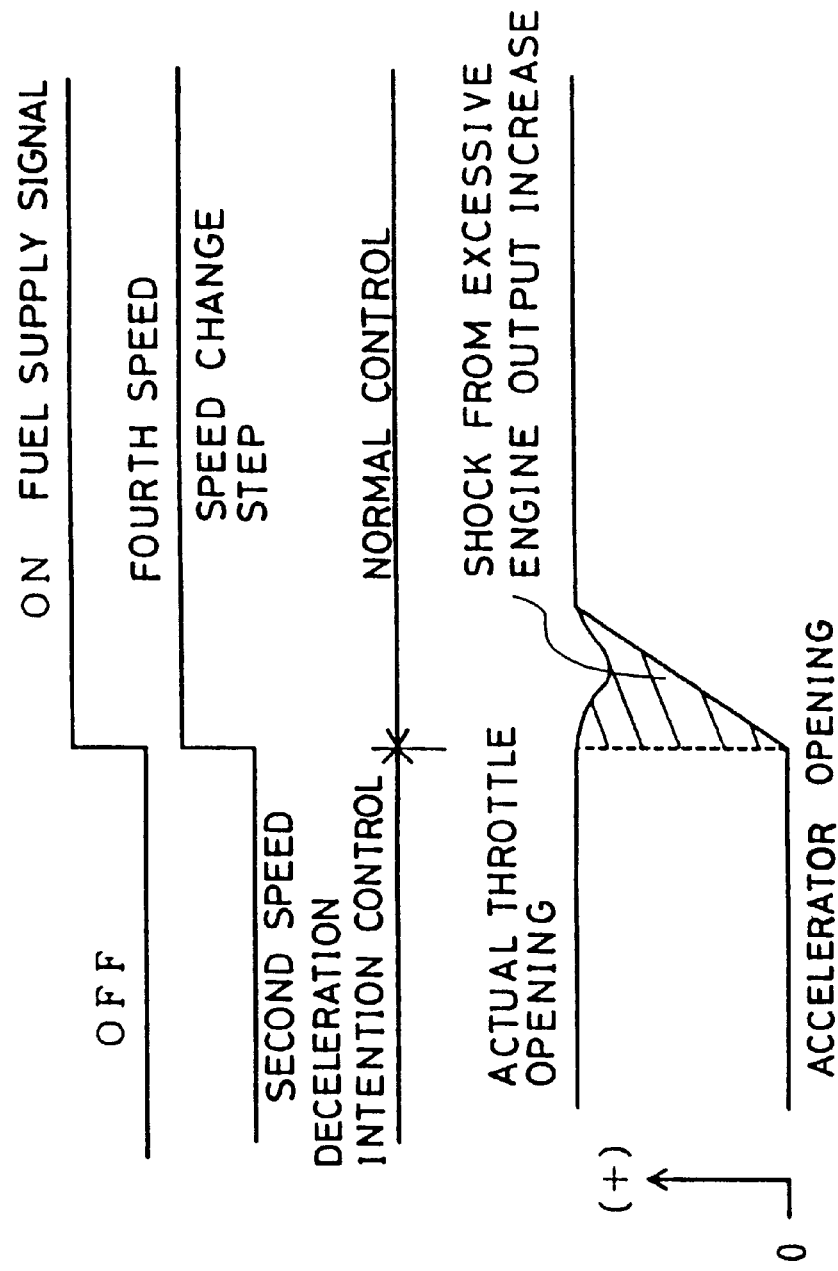

METHOD AND APPARATUS FOR CONTROLLING A VEHICLE

FIELD OF THE INVENTION

The present invention relates to a method and apparatus for controlling a vehicle provided with an automatic transmission connected to an internal combustion engine.

DESCRIPTION OF THE RELATED ART

In general, an automatic transmission of a vehicle fitted with an internal combustion engine automatically changes based on a speed change pattern which has been previously set in accordance with travelling conditions of the vehicle.

That is to say, a speed change pattern for setting a speed change step (or speed change ratio) corresponding to vehicle speed and engine load (for example throttle opening) is stored in a storage means of a control section, and speed change is controlled in accordance with this speed change pattern. Normally the speed change pattern is set so that if the vehicle speed is the same, there is a tendency to shift up the smaller the engine load.

With this conventional automatic speed change control apparatus however, if for example at the time of decent, contrary to a deceleration requirement of a driver to fully close the throttle valve opening, there is a tendency to shift up so that a feeling of disorder contrary to the deceleration requirement of the driver is experienced. Moreover the deceleration effect due to engine braking is not realized. Hence the drivability of the vehicle is compromised and the foot brake suffers excessive loading.

In order to solve this problem at the time of deceleration, the present applicants and others have proposed in Japanese unexamined patent publication No. 8-26001 an arrangement whereby, when at the time of travelling down a slope a deceleration intention of the driver is detected, the speed change step (speed change ratio) control and the throttle opening control and the fuel cut off control etc., are automatically carried out so that the vehicle acceleration (deceleration) reaches a target acceleration.

However, with the arrangement of the abovementioned Japanese unexamined patent publication No. 8-026001, in the case where the driver requests acceleration by pressing the accelerator pedal, from the condition where a deceleration intention has been detected and control of the speed change ratio, the throttle valve opening and the fuel cut off has been carried out, then the speed change ratio control and the throttle valve opening control revert simultaneously to normal control. Moreover with the fuel supply also there is a reversion from the fuel cut off condition to the fuel supply condition.

In this case, if for example the opening of the throttle valve is open more than for at the time of normal control for downhill control, there can be cases where due to problems such as with responsiveness of the throttle actuator for electronically controlling the opening of the throttle valve, fuel supply control is restored while the throttle valve is open more than necessary (refer to FIG. 14). Hence there is the likelihood of a comparatively large shock or an unintended acceleration.

The present invention takes into consideration the abovementioned situation with the conventional arrangement, with the object of providing a method and apparatus for controlling a vehicle wherein the throttle opening control and the fuel cut off control are carried out so as to obtain an intended acceleration of the driver while travelling downhill, such that return to normal control can be carried out smoothly, and the vehicle drivability further improved.

SUMMARY OF THE INVENTION

Accordingly, with the method (or apparatus) for controlling a vehicle according to the present invention, there is a method (or apparatus) for controlling a vehicle fitted with an internal combustion engine as a power source which includes: a deceleration intention automatic control step (or device) for automatically controlling when a deceleration intention of a driver is detected, at least a throttle valve opening control and a fuel supply control for controlling engine output, so as to obtain a target vehicle acceleration; the method being characterized in including; a normal control reversion step (or device) for returning the throttle valve opening control and the fuel supply control to normal control once the throttle valve opening has reached a predetermined opening, when the intention of the driver has shifted from a deceleration intention to a non deceleration intention and the automatic control by the deceleration intention automatic control step (or device) has been returned to normal control based on the intention of the driver.

With the present invention incorporating such a construction, at the time of a driver deceleration intention (for example when travelling downhill), then with an arrangement where the opening control for the throttle valve and the fuel supply control (for example fuel cut off control) are automatically controlled in order to obtain a predetermined target vehicle acceleration, when the intention of the driver shifts from a deceleration intention to a non deceleration intention, and hence the automatic control reverts to normal control, the fuel supply control is returned to normal control once the throttle valve opening has reached a predetermined opening. Therefore, it is possible to avoid the situation where for example, the fuel supply control reverts to normal control with the throttle valve opened more than necessary. Consequently the occurrence of shock or an unintended acceleration due to a mismatch in the throttle opening at the time of reverting to normal control can be suppressed. Hence vehicle drivability can be further improved.

The construction may be such that the normal control reversion step (or device) fixes for a predetermined period from after the intention of the driver has shifted from a deceleration intention to a non deceleration intention, a control target value for the throttle valve opening to a predetermined value.

With this arrangement, the fuel supply control can be returned to the normal control, with the throttle valve opening fixed (held) at the predetermined opening. Therefore, the abovementioned operational effect can be reliably achieved, with a comparatively simple construction.

Moreover, the predetermined period may be set based on a throttle valve opening when a non deceleration intention of the driver is detected.

If this is done, then while the required time from when the intention of the driver shifts from the deceleration intention to the non deceleration intention, until the throttle valve reaches the predetermined opening, will differ depending on the throttle valve opening immediately before detecting the non deceleration intention, the predetermined period can be set corresponding to this. Consequently, when the fuel supply control reverts to the normal control, it is possible to reliably prevent the possibility of the fuel supply control being restored with the throttle valve opened more than necessary, irrespective of the size of the opening of the throttle valve immediately before detection of the non deceleration intention. Therefore, the occurrence of shock or an unintended acceleration at the time of reversion to normal control can be suppressed. Hence vehicle drivability can be further improved.

If the predetermined opening is made approximately fully closed, then the occurrence of shock or an unintended acceleration at the time of reversion to normal control can be suppressed to a maximum.

Moreover the construction may be such that the normal control reversion step (or device) returns the throttle valve opening control to normal control once a predetermined fuel supply condition has been reached.

With this construction, then if the opening control of the throttle valve is restored to normal control (that is to say the forcible automatic control using the throttle actuator is restored to opening control corresponding to the intention of the driver) once the fuel supply control has been restored to normal control, then for example in the case where there is a control response delay (the response delay time from giving a revert command until actual reversion) at the time of reverting to normal control of the fuel supply control, so that the fuel supply is started late with the throttle valve opened more than necessary, and hence there is the possibility of shock or a non-intended acceleration, this possibility can be reliably avoided.

Furthermore, if detection of the predetermined fuel supply condition is carried out based on an elapsed time from after the intention of the driver has shifted from a deceleration intention to a non deceleration intention, then the predetermined fuel supply condition can be detected with a comparatively simple construction.

Moreover the elapsed time may be set based on the engine rotational speed.

That is to say, the fuel injection frequency for each predetermined time differs due to the engine rotational speed; in other words the higher (lower) the engine rotational speed the shorter (longer) the time (supply interval) from there being a fuel supply requirement until there is an actual predetermined fuel supply condition. Therefore if the elapsed time is set based on not only the engine rotational speed but also the fuel supply interval, the control accuracy and control responsiveness when the opening control of the throttle valve returns to normal control once the predetermined fuel supply condition has been achieved can be kept high.

The construction may be such that the deceleration intention automatic control step (or device) includes a speed change control step (or device) for automatically controlling a speed change ratio of a speed change device disposed between an output shaft of the engine and a drive wheel of the vehicle.

With such a construction, then when the deceleration intention of the driver is detected, speed change ratio control can also be carried out in order to obtain the target vehicle acceleration. Therefore the automatic control (downhill control and the like) carried out so as to obtain the target vehicle acceleration when a deceleration intention of the driver is detected can be even more accurate, while achieving the abovementioned various operational effects.

BRIEF DESCRIPTION OF THE DRAWINGS

FIG. 14 is a time chart for explaining problems with conventional arrangements.

DESCRIPTION OF THE PREFERRED EMBODIMENTS

As follows is a description of embodiments of the present invention, with reference to the appended drawings.

Figure 1:
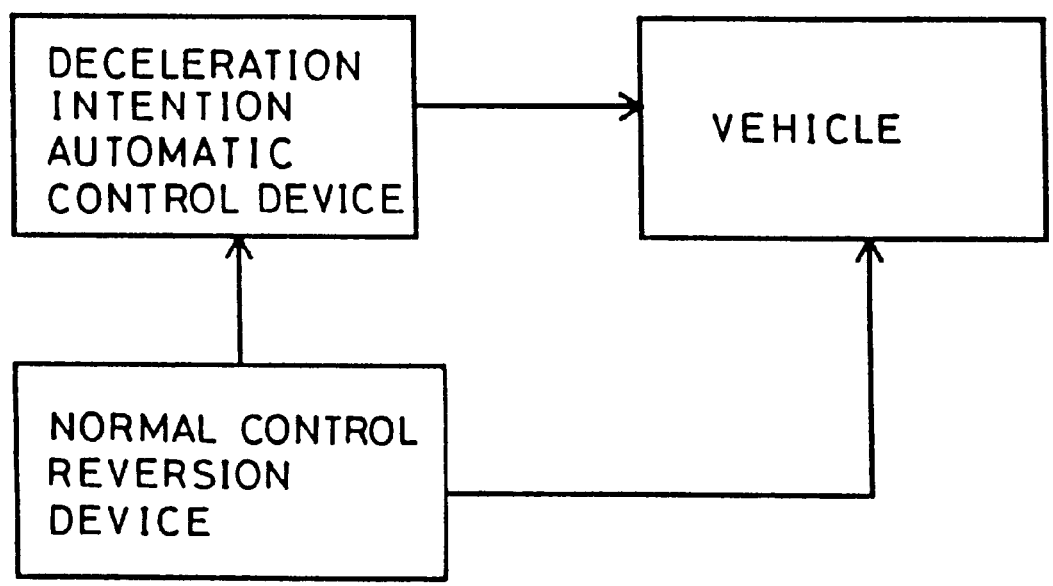
FIG. 1 is a block diagram illustrating a configuration of the present invention.
Figure 2:
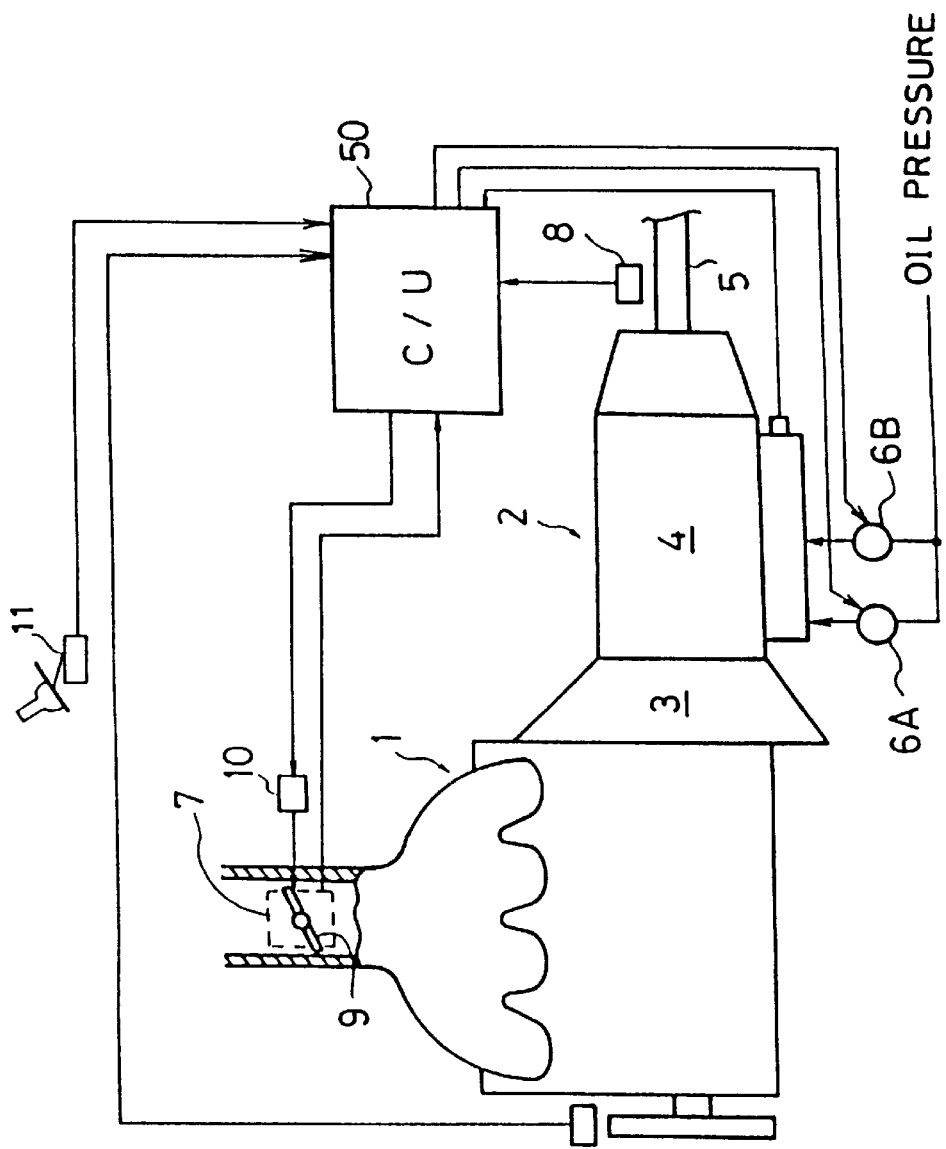
FIG. 2 is a system configuration diagram for a first embodiment of the present invention.

With a first embodiment of the present invention, as shown in FIG. 2, an engine 1 is connected to an automatic transmission 2 so as to transfer the engine torque to vehicle drive wheels (not shown in the figure). The automatic transmission 2 comprises a torque converter 3 into which the torque generated in the engine 1 is input via a fluid, a multi step speed change gear mechanism 4 which takes the output from the torque converter 3 and outputs this after a speed change, and a hydraulic mechanism (not shown in the figure) for operating the speed change gear mechanism 4.

Solenoid valves 6A, 6B are included in the hydraulic mechanism of the speed change gear mechanism 4. By switching opening and closing combinations of the solenoid valves 6A, 6B, coupling and release combinations of respective clutches housed inside the speed change gear mechanism 4 are changed to thereby effect speed change to a desired speed change step (speed change ratio).

ON/OFF control of the solenoid valves 6A, 6B is carried out by means of control signals from a control unit 50 which is made up of a CPU, ROM, RAM, A/D converter, input/output interface and the like.

Signals from various sensors are input into the control unit 50.

For the various sensors, there are provided a throttle sensor 7 which generates an output signal corresponding to a throttle opening TVO, a vehicle speed sensor 8 which detects the rotational speed of an output shaft 5 of the automatic transmission 2, to thereby detect speed vehicle speed VSP, and an accelerator sensor 11 for detecting the accelerator opening.

A throttle valve 9 linked to an accelerator pedal, for adjusting the output torque of the engine 1, is provided with a throttle actuator 10 which can effect control independently of accelerator operation of a driver. The throttle actuator 10 is driven and controlled by a signal from the control unit 50.

As follows is a description in accordance with the flow chart shown in FIG. 3 through FIG. 6, of the speed change control and reversion control at the time of a deceleration intention, as carried out by the control unit 50 which incorporates as software the function of the deceleration intention automatic control step (or device) and the normal control reversion step (or device) according to the present invention. The function of the deceleration intention automatic control step (or device) and the normal control reversion step (or device) according to the present invention is achieved as explained hereunder by the flow charts of FIG. 3 through FIG. 6.

Figure 3:
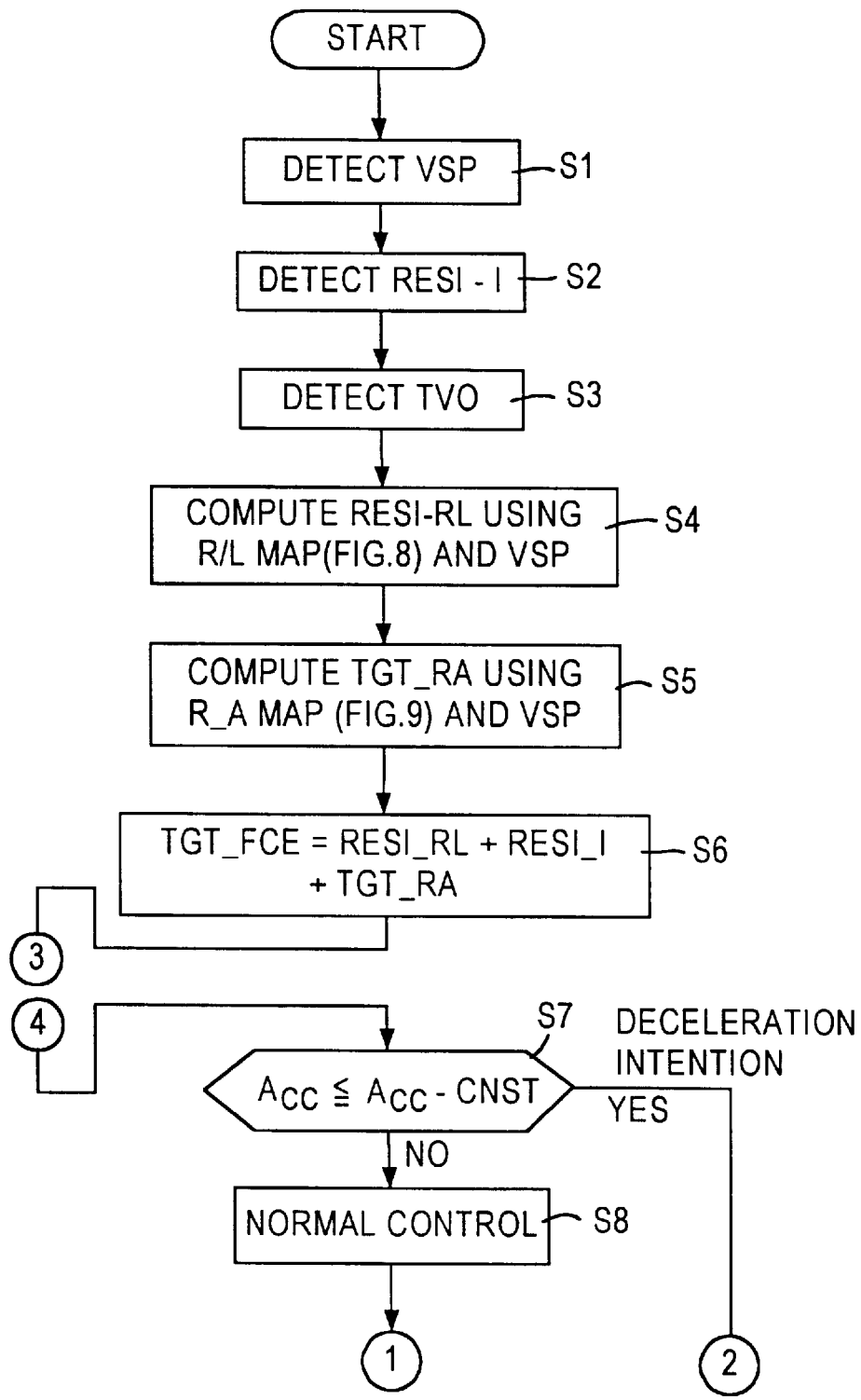
FIG. 3 is a flow chart (first flow chart) for explaining deceleration control and reversion control for the first embodiment.

At first in step 1 (indicated by S1 in the figure and hereunder) in the flow chart of FIG. 3, vehicle speed VSP is read.

Figure 7:
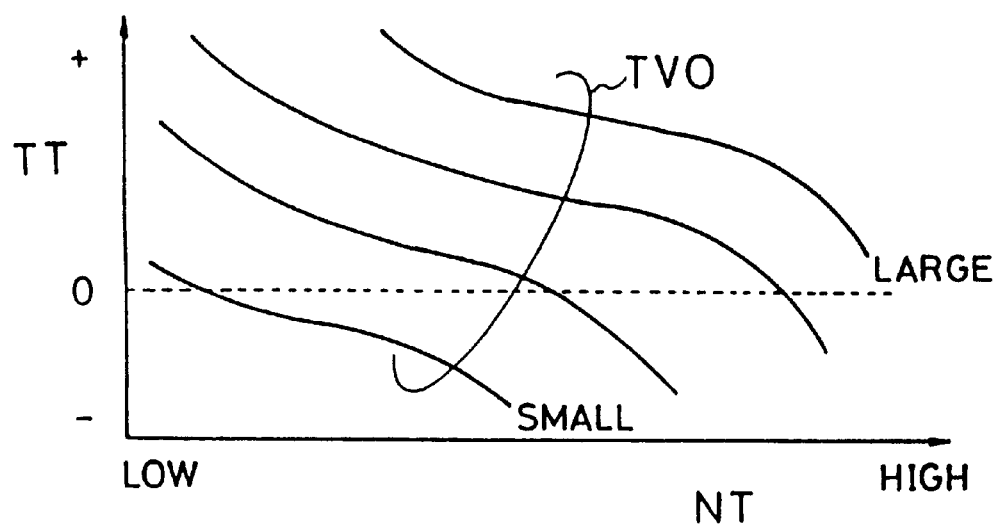
FIG. 7 is an example of a TT map (for looking up turbine torque)
Figure 8:
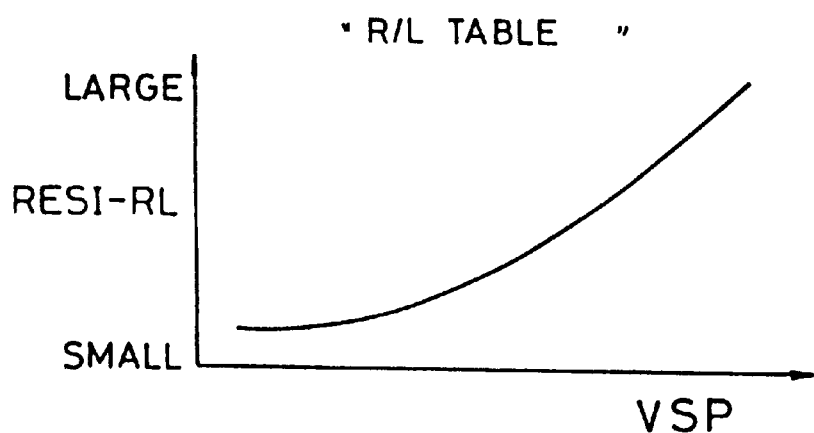
FIG. 8 is an example of an R/L table (for computing air resistance+rolling resistance)

Then in step 2, travelling resistance (RESI_I) is obtained, for example as below:

$$RES\_I=(FCE)-(RESI\_A)-(RESI\_RL)$$

where FCE is the drive force $[=TT \times kTT (g)]$ where TT is the turbine torque obtained from a vehicle speed VSP and turbine torque TT map (refer to FIG. 7, a three dimensional map of NT, TVO, and TT, and kTT (g) is a constant determined from the current speed change step (g), RESI_A is the acceleration resistance $[=ALF \times ka]$ where ALF is the current acceleration, and ka is a constant for computing acceleration resistance (set for example, according to the vehicle weight), and RESI_RL is air resistance+rolling resistance, obtained using an R/L table (a table for computing air resistance+rolling resistance, refer to FIG. 8) and the vehicle speed VSP.

Alternatively, an incline sensor may be provided, and the travelling resistance obtained from (incline sensor output)×k (coefficient).

In step 3, the throttle valve opening TVO is detected.

Then in step 4, the air resistance+rolling resistance (RESI_RL) is obtained using an R/L table (table for computing air resistance+rolling resistance, refer to FIG. 8) and vehicle speed VSP. In the case where RESI_RL has previously been obtained in step 2, then this value can be used.

Figure 9:
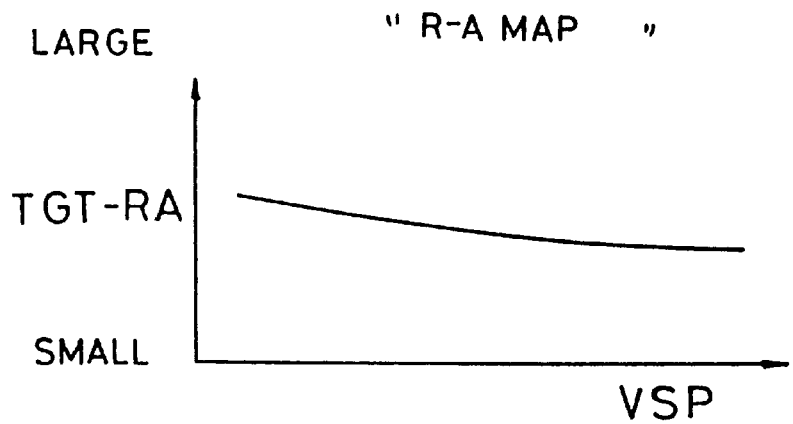
FIG. 9 is an example of an R-A map (for computing target acceleration)

In step 5, a target acceleration (TGT_RA) is obtained using an R-A map (refer to FIG. 9) and vehicle speed VSP. Now if as with the present embodiment, the target acceleration (TGT_RA) is computed corresponding to a vehicle condition (here this corresponds to vehicle speed VSP. Other conditions are vehicle running resistance, current speed change step and the like), then the target acceleration can be computed to a high accuracy with the primary factor having a large influence on the actual vehicle acceleration as a parameter. Hence the accuracy of control can be even greater.

In step 6, a drive force (TGT_FCE) for realizing the target acceleration is obtained from the following equation:

$$TGT\_FCE=(RESI\_RL)+(RESI\_I)+(TGT\_RA)$$

Figure 4:
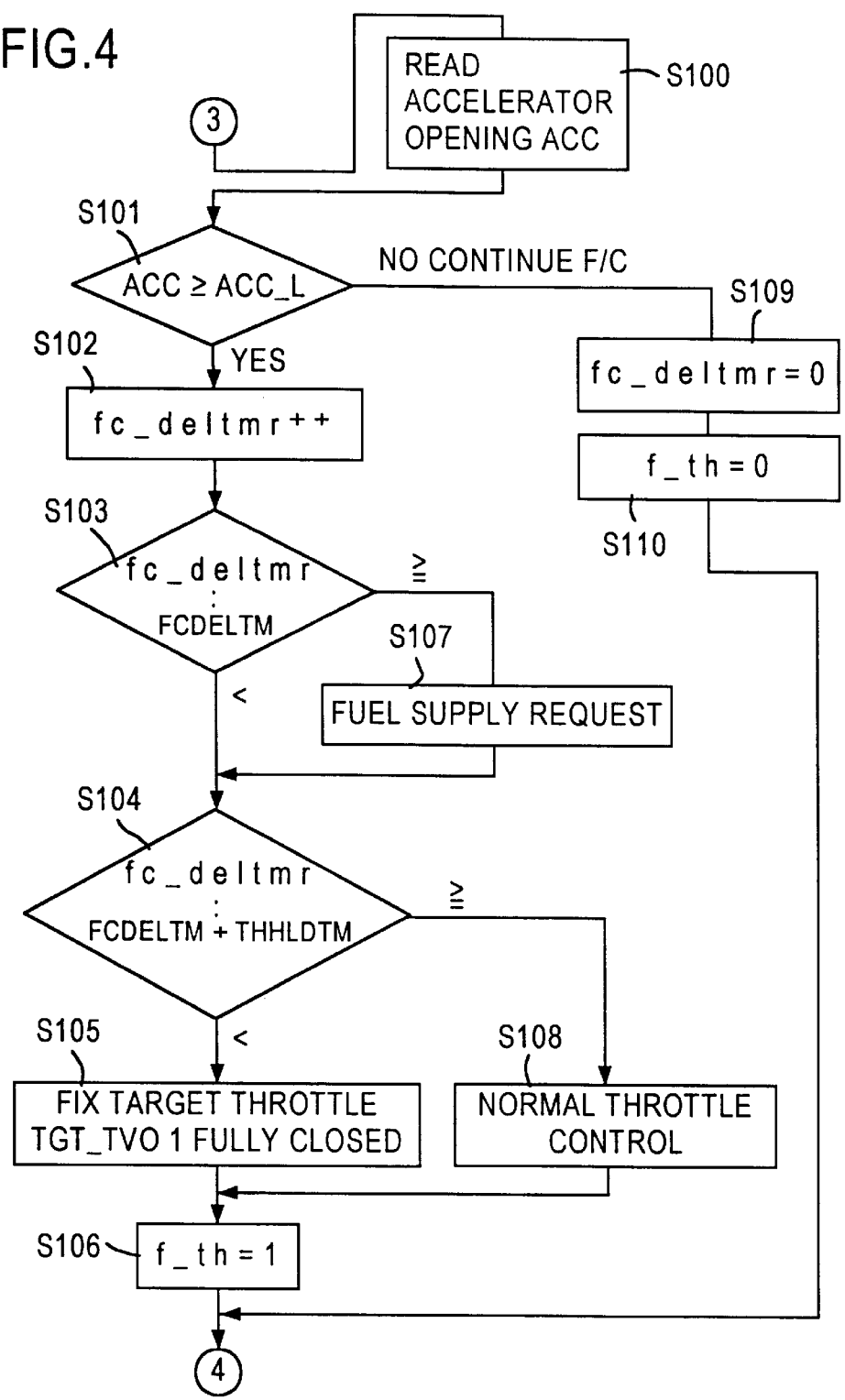
FIG. 4 is a flow chart (second flow chart) for explaining deceleration control and reversion control for the first embodiment.
Figure 5:
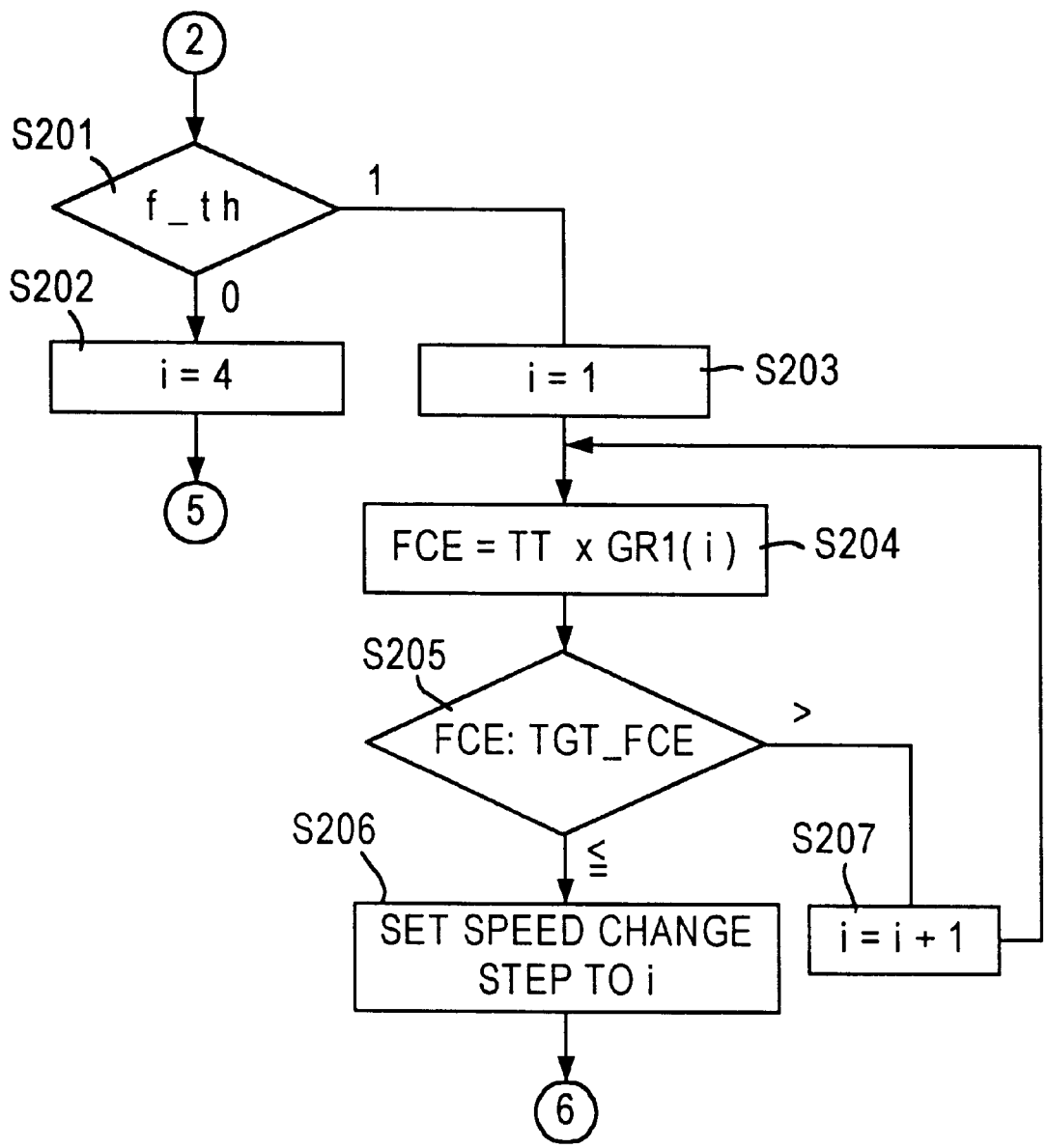
FIG. 5 is a flow chart (third flow chart) for explaining deceleration control and reversion control for the first embodiment.

Control then proceeds to step 100 of the flow chart of FIG. 4.

In step 100 the accelerator opening ACC is read.

Then in step 101 it is judged if the accelerator opening ACC is equal to or greater than a fuel cut off release opening (ACC_L).

If YES (ACC≧ACC_L), it is necessary to release fuel cut off, and hence control proceeds to step 102.

If NO, (ACC<ACC_L), the driver intends to decelerate. It is therefore necessary to continue fuel cut off, and hence control proceeds to step 109.

In step 109, providing for a fuel cut off release time, a fuel cut off release delay time (fc_deltmr) is set to zero. Then in step 110, a throttle control flag (f_th) is set to zero, and control proceeds to step 7 of the flow chart of FIG. 3.

On the other hand, in the case where it is necessary to release fuel cut off, then in step 102, the fuel cut off release delay time (fc_deltmr) is incremented (fc_deltmr++), and control then proceeds to step 103.

In step 103, the fuel cut off release delay time (fc_deltmr) and a first predetermined time (FCDELTM) are compared, and if (fc_deltmr)<(FCDELTM), control proceeds as is to step 104.

In step 104, the fuel cut off release delay time (fc_deltmr) and a second predetermined time (FCDELTM+THHLDTM) are compared.

In a case where control proceeds from step 103 to step 104, since (fc_deltmr)<(FCDELTM) has been judged in step 103, (fc_deltmr)<(FCDELTM+THHLDTM) is judged, then control proceeds to step 105.

In step 105, a target throttle opening (TGT_TVO1) of the throttle valve is fixed to be fully closed.

On the other hand, if (fc_deltmr)≧(FCDELTM) is judged in step 103, control proceeds to step 107 wherein the fuel supply is requested, then control proceeds to step 104.

Here, even if (fc_deltmr)≧(FCDELTM), during (fc_deltmr)<(FCDELTM+THHLDTM) is judged in step 104, control proceeds to step 105 wherein the target throttle opening (TGT_TVO1) is fixed to be fully closed. Then, if (fc_deltmr)≧(FCDELTM+THHLDTM) is judged in step 104, control proceeds to step 108 wherein the opening control of the throttle valve 9 is reversed to the normal control.

Namely, when it is judged based on the accelerator opening ACC that the driver has a deceleration intention, the fuel supply is cut off. However, if the throttle valve 9 is opened when the fuel supply is restarted in response to the fuel cut off release request, the occurrence of shock and unintended acceleration is expected.

Thus, if the fuel cut off release is requested, the throttle valve 9 is once fully closed and then the fuel supply is restarted under a state where the throttle valve 9 is fully closed. Incidentally, for driving the throttle valve 9 to be fully closed, the response time of the throttle actuator is needed. Therefore, the target throttle opening (TGT_TVO1) is fixed to be fully closed during a period of time a first predetermined time (FCDELTM) has lapsed after the intention of the driver is shifted from the deceleration to the non-deceleration.

Further, when the first predetermined time (FCDELTM) has passed, it is assumed that the opening degree of the throttle valve 9 is approximately fully closed and the restart of the fuel supply is instructed. However, there is a time delay until the fuel supply is actually carried out from instructing the restart of the fuel supply. Therefore, if the throttle opening control of the throttle valve 9 is returned to the normal control simultaneously with the restart instruction of fuel supply, there is a possibility that the fuel supply is carried out after the throttle valve is opened.

Consequently, the target throttle opening (TGT_TVO1) is continuously retained to be fully closed until a predetermined time THHLDTM (third predetermined time) has passed from the restart instruction of fuel supply, and then the throttle opening control of the throttle valve is returned to the normal control at a time of (fc_deltmr)≧ (FCDELTM+THHLDTM).

In step 106, the throttle control flag (f_th) is set to 1, and control proceeds to step 7 of the flow chart of FIG. 3.

In step 7 of the flow chart of FIG. 3, it is judged if the accelerator opening ACC is less than or equal to a deceleration intention judgment opening (ACC-cnst).

If NO (ACC>ACC-cnst), the driver has no intention to decelerate. Hence in order to respect the intention of the driver and to not give a feeling of disorder to the driver, normal speed change control corresponding to the normal speed change pattern is carried out in step 8 rather than carrying out forcible vehicle control for a down slope, and the program then terminated.

On the other hand, if YES (ACC≦ACC−cnst), it is judged that the driver intends to decelerate. Hence control proceeds to step 201 of the flow chart of FIG. 5 in order to carry out an actual down shift.

In step 201, it is judged if the throttle control flag (f_th) is 1 or 0. If (f_th)=0, control proceeds to step 202, while if (f_th)=1, control proceeds to step 203.

Figure 6:
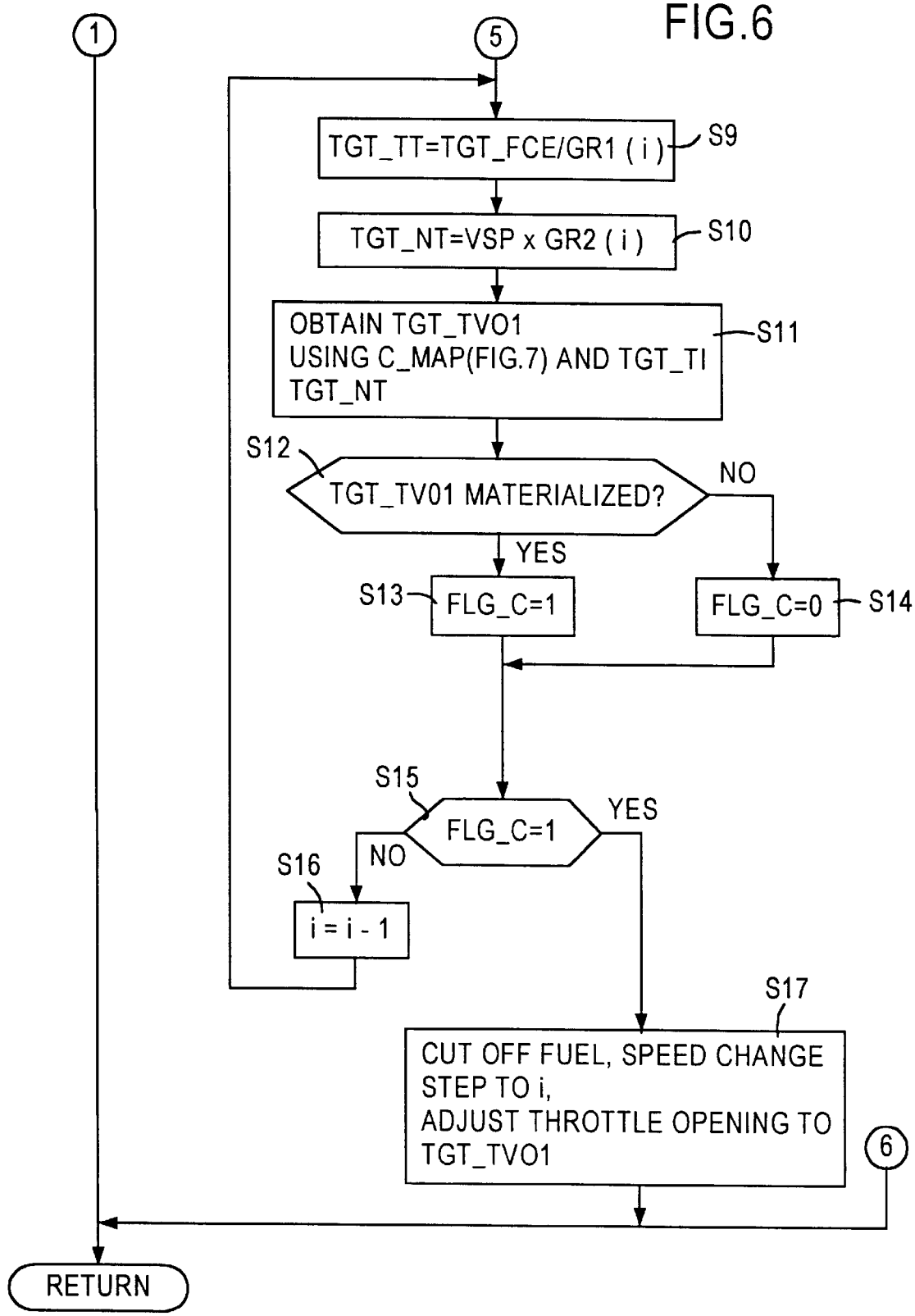
FIG. 6 is a flow chart (fourth flow chart) for explaining deceleration control and reversion control for the first embodiment.

In step 202, since (f_th)=0, and there is no requirement to release fuel cut off, then i is set to 4, and control proceeds to step 9 of the flow chart of FIG. 6.

In step 9, the turbine torque (TGT_TT) for realizing the beforementioned TGT_FCE is obtained from the following equation:

$$TGT\_TT = (TGT\_FCE)/GR1 \quad (i)$$

where GR1 (i) is a constant determined for the gear ratio, and i is the speed change step.

In step 10, an estimation value (TGT_NT) for the turbine rotational speed in the speed change step i is determined from the following equation:

$$TGT\_NT = VSP \times GR2 \quad (i)$$

where GR2 (i) is a constant determined for the gear ratio, and i is the speed change step.

Figure 10:
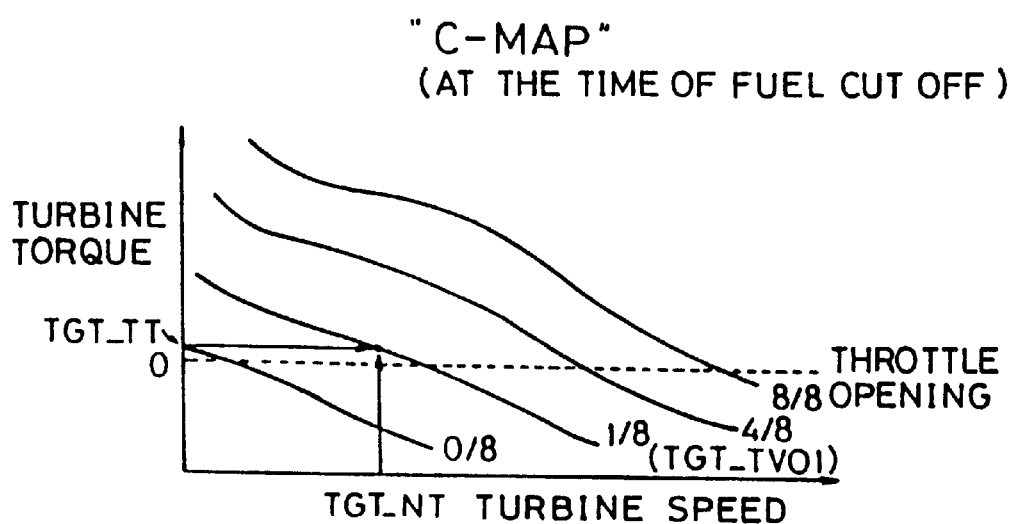
FIG. 10 is an example of a C-MAP (a map of all TT-NT characteristic curves at the time of fuel cut off)

In step 11, the target throttle opening (TGT_TVO1) for at the time of fuel cut off is obtained using a C-MAP and TGT_TT and TGT_NT (refer to FIG. 10).

In step 12, it is judged if TGT_TVO1 has materialized. That is to say it is judged if there is a throttle opening whereby the target drive force TGT_FCE can be realized. If YES, control proceeds to step 13, while if NO, control proceeds to step 14.

In step 13, a control flag FLG_C is set to 1.
In step 14, the control flag FLG_C is set to 0.
In step 15, it is judged if FLG_C=1.

If YES, control proceeds to step 17. In step 17 the fuel supply to the engine 1 from the fuel injection valve is stopped (fuel cut off), the speed change device is operated to give the speed change step i, and the throttle opening is adjusted by means of the throttle actuator 10 to give TGT_TVO1. The program is then terminated.

On the other hand, if NO, control proceeds to step 16.
On step 16, i is set to (i−1), and control returns to step 9.

On the other hand, in the case where in step 201 it is judged that the throttle control flag (f_th) equals 1, then control proceeds to step 203. In step 203, i is set to 1, and control then proceeds to step 204.

In step 204, the drive force FCE(=TT×GR1 (i)) is computed.

Then in step 205, the drive force (FCE) computed in step 204 and the drive force (TGT_FCE) for realizing the target acceleration are compared. If (FCE)≦(TGT_FCE), control proceeds to step 206, while if (FCE)>(TGT_FCE), controls proceeds to step 207.

On step 206, the speed change step is set to i, and the program terminated.

In step 207, i is set to (i+1), and control returns to step 204. The routine then repeats until in step 205, (FCE)≦ (TGT_FCE).

In this way, with the present embodiment, when there is a deceleration intention as when travelling downhill, then with an arrangement where speed change control, throttle opening control and fuel supply control (for example fuel cut off control) are carried out in order to obtain the predetermined target acceleration, at the time of a shift from a deceleration intention to a non deceleration intention, once the actual throttle opening has become the predetermined opening, the fuel supply control is restored to normal control. Hence the occurrence of shock or an unintended acceleration at the time of reversion can be suppressed so that the vehicle drivability can be further improved.

For the predetermined opening, the approximately fully closed condition is preferable from the point of view of suppressing as much as possible the occurrence of shock or an unintended acceleration.

If as with the present embodiment, the opening control of the throttle valve 9 is restored to normal control (that is to say the forcible opening control using the actuator 10 is restored to normal opening control corresponding to the intention of the driver) once the fuel supply control has been restored to normal control, then for example even in the case where there is a response delay in starting the fuel supply control, the fuel supply is started with the throttle valve 9 in the open condition. Therefore the possibility of shock or an unintended acceleration can be reliably avoided.

Next is a description of a second embodiment.

Figure 11:
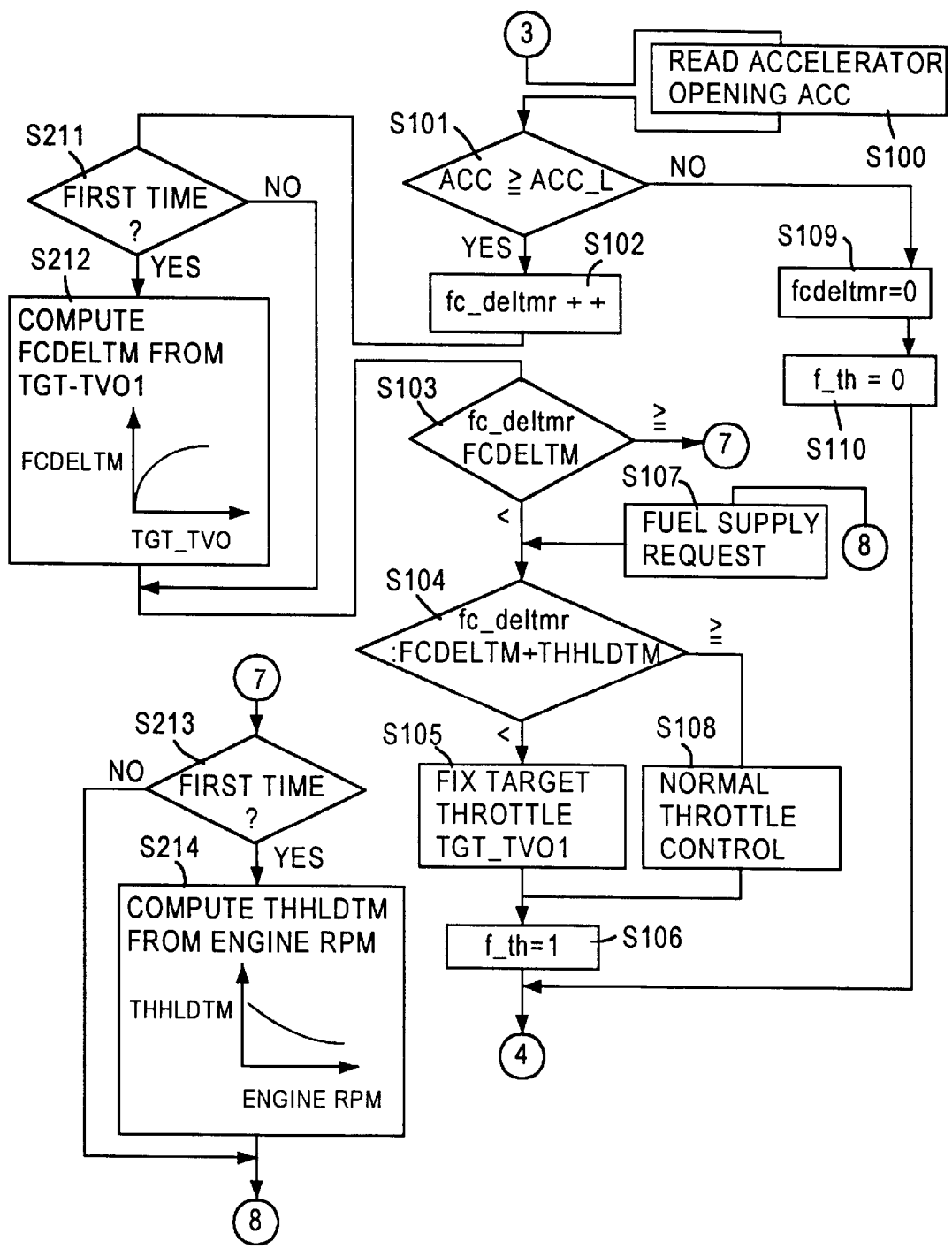
FIG. 11 is a flow chart for explaining deceleration control and reversion control for a second embodiment of the present invention.

With the second embodiment, instead of the flow chart of FIG. 4 for the first embodiment, the flow chart of FIG. 11 is executed.

That is to say, with the second embodiment, the first predetermined time (FCDELTM) is set based on the throttle opening TVO, and the second predetermined time (FCDELTM+THHLDTM) is set based on the engine rotational speed.

More specifically, with the second embodiment also, as with the first embodiment, at the time of shifting from a deceleration intention to a non deceleration intention, in the first predetermined time after detecting the non deceleration intention, the throttle valve 9 is fully closed. Then after lapse of the first predetermined time, the control shifts from the fuel cut off condition to the fuel supply condition. However with the second embodiment, the first predetermined time is set based on the throttle opening TVO immediately before detecting the non deceleration intention. That is to say, although the required time until fully closed differs each time the throttle opening TVO immediately before detecting the non deceleration intention differs, it is possible to correspond accurately to this.

Moreover, with the second embodiment also, as with the first embodiment, the opening control of the throttle valve 9 returns to normal control once the fuel supply condition has been reached. That is to say, the opening control of the throttle valve 9 returns to normal control after the second predetermined time lapse. However with the second embodiment the second predetermined time is set based on the engine rotational speed. More specifically, the fuel injection frequency for each predetermined time differs due to the engine rotational speed, and hence the higher (lower) the engine rotational speed the shorter (longer) the time (injection interval) from there being a fuel supply requirement until there is an actual fuel supply condition. Therefore with the setting of the second predetermined time based on not only the engine rotational speed but also the injection interval, the control accuracy and responsiveness when the opening control of the throttle valve 9 returns to normal control once the fuel supply condition has been reached can be kept high.

Description is now given of the flow chart of FIG. 11 executed according to the second embodiment. As mentioned before, the flow chart of FIG. 11 is executed instead of the flow chart of FIG. 4 for the first embodiment. Steps common to the steps of the flow chart of FIG. 4 of the first embodiment are denoted by the same number and description is omitted, and only those step that differ will be explained hereunder.

More specifically, with the second embodiment, after executing steps 100~102, control proceeds to step 211.

In step 211, it is judged if this is the first time. If YES, control proceeds to step 212. If NO, resetting is not required since at the time of executing the previous routine, the first predetermined time was set in step 212 to correspond to the opening of the throttle valve 9. Control therefore proceeds as is to step 103.

In step 212, for example a map such as shown in the flow chart is referred to, and a first predetermined time (FCDELTM) necessary for the throttle opening TVO immediately before detecting a non deceleration intention to become the target opening (TGT_TVO) is computed and set.

Control then proceeds to step 103. In step 103, the first predetermined time (FCDELTM) set corresponding to the throttle opening in step 212, and the fuel cut off release delay time fc_deltmr are compared. Control then proceeds to step 104 and thereafter as with the first embodiment.

In this way, then even if the required time until the throttle valve 9 is fully closed differs due to the throttle opening TVO immediately before detecting a non deceleration intention, since the first predetermined time (FCDELTM) can be set corresponding to this, then when the fuel cut off control is restored to normal control, the possibility that fuel supply will be restored with the throttle valve 9 open can be reliably prevented. Therefore the occurrence of shock or an unintended acceleration at the time of reversion can be suppressed so that the vehicle drivability can be further improved.

In step 103, if judged that the fuel cut off release delay time (fc_deltmr) ≧ the first predetermined time (FCDELTM), then with the second embodiment control proceeds to step 213.

In step 213, it is judged if this is the first time. If YES, control proceeds to step 214. If NO, resetting is not required since at the time of executing the previous routine, the second predetermined time was set corresponding to the engine rotational speed. Control therefore proceeds as is to step 107.

In step 214, for example a map such as shown in the flow chart is referred to, and (THHLDTM) is obtained based on the engine rotational speed. This is then used to set the second predetermined time (FCDELTM+THHLDTM).

After this, control proceeds to step 107 and thereafter, and control is carried out the same as described for the first embodiment.

In this way, since the second predetermined time is set based on not only the engine rotational speed but also the injection interval, then once the fuel supply condition has been reached, the opening control of the throttle valve 9 can be returned to normal control with good response and reliability.

Next is a description of a third embodiment of the present invention.

With the first and second embodiments, at the time of releasing downhill travel control, in order to shift the opening control of the throttle valve 9 to normal control once the fuel supply condition has been reached, then in step 104, the fact that the fuel supply condition has been reached is detected by detecting that the second predetermined time (FCDELTM+THHLDTM) has elapsed from after the accelerator opening ACC becomes equal to or greater than the fuel cut off release opening (ACC_L). However with the third embodiment, the fact that the fuel supply condition has been reached is detected as described below.

Figure 12:
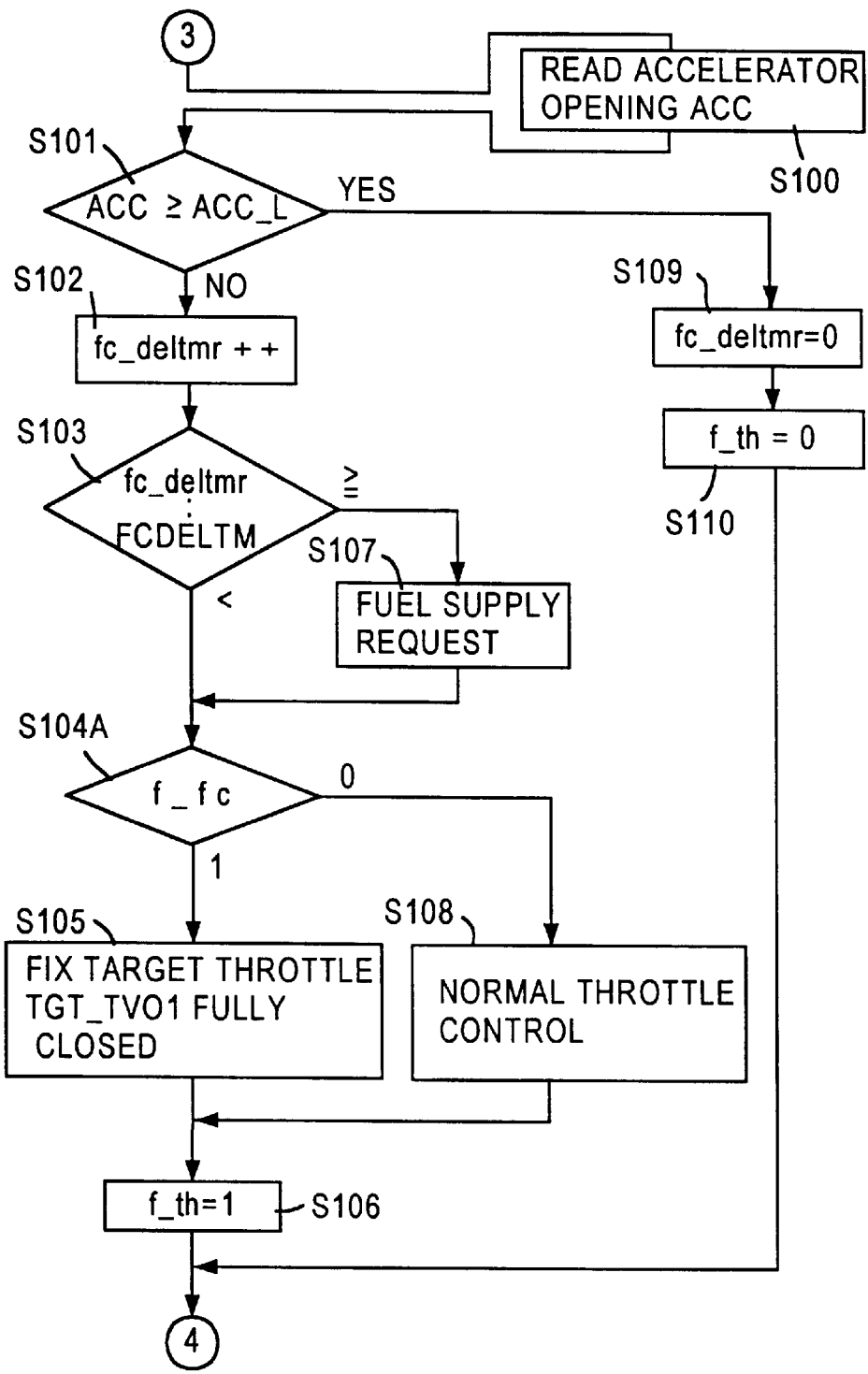
FIG. 12 is a flow chart for explaining deceleration control and reversion control for a third embodiment of the present invention.

With the third embodiment, the flow chart of FIG. 12 is executed instead of the flow chart of FIG. 4 described for the first embodiment.

On the flow chart of FIG. 12, the only step different from the flow chart of FIG. 4 is step 104A, and hence only this step 104A will be described, and description of the other steps is omitted.

On step 104A, it is judged if a fuel cut off judgment flag (f_fc) is 0 or 1.

If (f_fc)=1, then fuel is being cut off, and hence control proceeds to step 105 without the opening control of the throttle valve 9 being returned to normal control.

On the other hand, if (f_fc)=0, then fuel is being supplied, and hence control proceeds to step 108 to thereby return the opening control of the throttle valve 9 to normal control.

Figure 13:
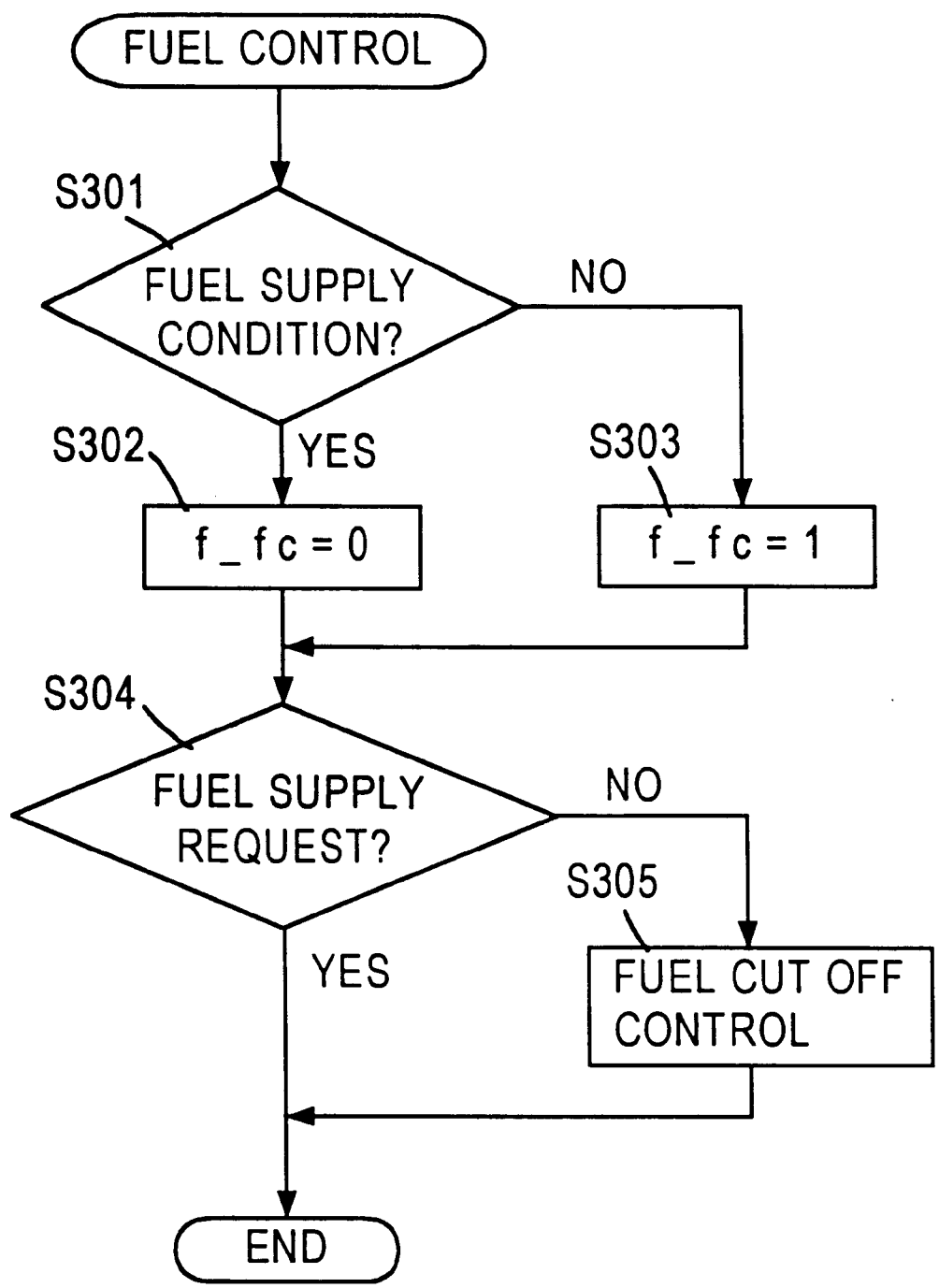
FIG. 13 is a flow chart for explaining a method of setting a fuel cut off judgment flag (f_fc) in the abovementioned embodiments.

The fuel cut off judgment flag (f_fc) is set by executing the flow chart of FIG. 13.

A description of the flow chart of FIG. 13 is now given.

On step 301, it is judged if fuel supply is actually being carried out. This judgment can be carried out for example by detecting an open valve drive signal to the fuel injection valve, a movement of a needle valve of the fuel injection valve, a change in the internal pressure of the fuel supply system, or the exhaust characteristics or exhaust temperature or the like.

If YES, control proceeds to step 302, while if NO, control proceeds to step 303.

In step 302, since judged that fuel supply is actually being carried out, the fuel cut off judgment flag (f_fc) is set to 0, and control proceeds to step 304.

In step 303, since there is no fuel supply condition, the fuel cut off judgment flag (f_fc) is set to 1, and control proceeds to step 304.

In step 304, it is judged if there is a fuel supply requirement. If there is a fuel supply requirement, the program is terminated as is, while if not, fuel cut off control is executed in step 305 and the program then terminated.

In this way with the third embodiment, the fact that an actual fuel supply condition has occurred is detected, and based on the detection results, the opening control of the throttle valve 9 is returned to normal control. Therefore the opening control of the throttle valve 9 shifts to normal control before the fuel supply control has been actually restored. The fuel supply is thus started with the throttle valve 9 open, and hence the possibility of shock or unintended acceleration can be reliably avoided.

We claim:

1. A method of controlling a vehicle fitted with a throttle opening control means for setting a target throttle valve opening according to driving conditions and for controlling a throttle actuator based on said target throttle valve opening, said method comprising:

detecting whether a driver's intention is a deceleration intention or a non-deceleration intention;

cutting off a fuel supply to an internal combustion engine when the deceleration intention of the driver is detected; and fixing said target throttle valve opening to be approximately fully closed for a predetermined time from after the intention of the driver has shifted from a deceleration intention to the non-deceleration intention, and retaining a state where the fuel supply is cut off.

2. The method of controlling a vehicle according to claim 1, wherein fixing said target throttle valve opening to be approximately fully closed, and retaining a state where the fuel supply is cut off, comprises:

instructing a restart of fuel supply at a time when a first predetermined time has passed from after the intention of the driver has shifted from the deceleration intention to the non-deceleration intention; and retaining said target throttle valve opening during a period from when the intention of the driver has shifted from the deceleration intention to the non-deceleration intention until a second predetermined time which is longer than said first predetermined time, has passed.

3. The method of controlling a vehicle according to claim 2, wherein said first predetermined time is set based on said throttle valve opening at a time when it is detected that the intention of the driver has shifted from the deceleration intention to the non-deceleration intention.

4. The method of controlling a vehicle according to claim 2, wherein said second predetermined time is set as a sum of said first predetermined time and a third predetermined time and a third predetermined time which is set according to an engine rotation speed.

5. An apparatus for controlling a vehicle fitted with a throttle opening control means for setting a target throttle valve opening according to driving conditions and for controlling a throttle actuator based on said target throttle valve opening, said apparatus comprising:

a deceleration intention detecting means for detecting whether a driver's intention is a deceleration intention or a non-deceleration intention;

a fuel supply cutting off means for cutting off a fuel supply to an internal combustion engine when the deceleration intention of the driver is detected; and a normal control reversion means for fixing said target throttle valve opening to be approximately fully closed for a predetermined time from after the intention of the driver has shifted from a deceleration intention to the non-deceleration intention, and retaining a state where the fuel supply is cut off.

6. The apparatus for controlling a vehicle according to claim 5, wherein said normal control reversion means comprises:

a restart instructing means for instructing a restart of fuel supply at a time when a first predetermined time has passed from after the intention of the driver has shifted from the deceleration intention to the non-deceleration intention; and a fully closed state retaining means for retaining said target throttle valve opening to be approximately fully closed during a period from when the intention of the driver has shifted from the deceleration intention to the non-deceleration intention until a second predetermined time which is longer than said first predetermined time, has passed.

7. The apparatus for controlling a vehicle according to claim 6, wherein said first predetermined time is set based on said throttle valve opening at a time when it is detected that the intention of the driver has shifted from the deceleration intention to the non-deceleration intention.

8. The apparatus for controlling a vehicle according to claim 6, wherein said second predetermined time is set as a sum of said first predetermined time and a third predetermined time which is set according to an engine rotation speed.

* * * * *